April 18, 1967 L. G. H. ROCKEY 3,315,254

ELECTRICAL VOLTAGE STABILISING

Filed Nov. 2, 1964 2 Sheets-Sheet 1

Inventor
LESLIE GEORGE HENRY ROCKEY

By Bailey, Stephens & Huettig
Attorneys

Inventor
LESLIE GEORGE HENRY ROCKEY
By Bailey, Stephens & Huettig
Attorneys

United States Patent Office 3,315,254

Patented Apr. 18, 1967

3,315,254

ELECTRICAL VOLTAGE STABILISING

Leslie George Henry Rockey, Westbury-on-Trym, Bristol, England, assignor to British Aircraft Corporation (Operating) Limited, London, England, a British company Filed Nov. 2, 1964, Ser. No. 408,012
Claims priority, application Great Britain, Nov. 6, 1963, 43,839/63
4 Claims. (Cl. 340—347)

This invention relates to electrical circuits for supplying a stabilised output voltage in response to the switching of an input signal, such as is required to provide the stable reference voltage of a current digitiser. A problem which is particularly troublesome in the stabilisation of the supply to the summing point of a current digitiser is the requirement that the speed at which the stabilised voltage is reached must be fast, say of the order of 10 microseconds. It is also necessary that the stabilised voltage should not be affected by the state of the summing network of the digitiser when it is at balance.

According to the present invention, a stabilised reference supply circuit connected to a summing point through a digitising resistor includes a Zener diode, one electrode of which is connected, via a regulator resistor and a switching device having a low impedance and a high impedance state, to a source of supply potential and the other electrode of which is maintained at a substantially constant voltage; a resistive path in parallel with the Zener diode is of low impedance with respect to the impedance of the path formed by the switching device in its high impedance state and provides a discharge path for the diode. The reference voltage is developed at the junction of the Zener diode and the regulator resistor, and the low impedance of the Zener diode circuit when the Zener diode is in its conductive state enables fast "switch-on" times to be achieved subsequent to the transition of the switching device from its high impedance state to its low impedance state. The discharge path in parallel with the Zener diode enables the potential accumulated across the inherent capacity of the Zener diode in both its conductive and non-conductive states to be discharged and thus enables isolation from the summing point to be achieved.

Preferably, a transistor constitutes the switching device and, considering the current digitiser mentioned above, the transistor of the circuit may be arranged to be responsive to an associated bistable stage included in the main register of a counter.

Figure 1:
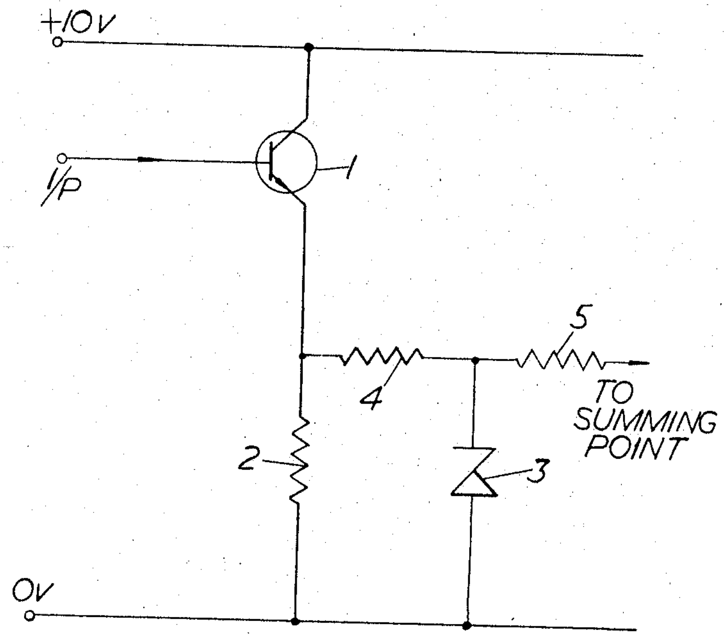
Figure 2:
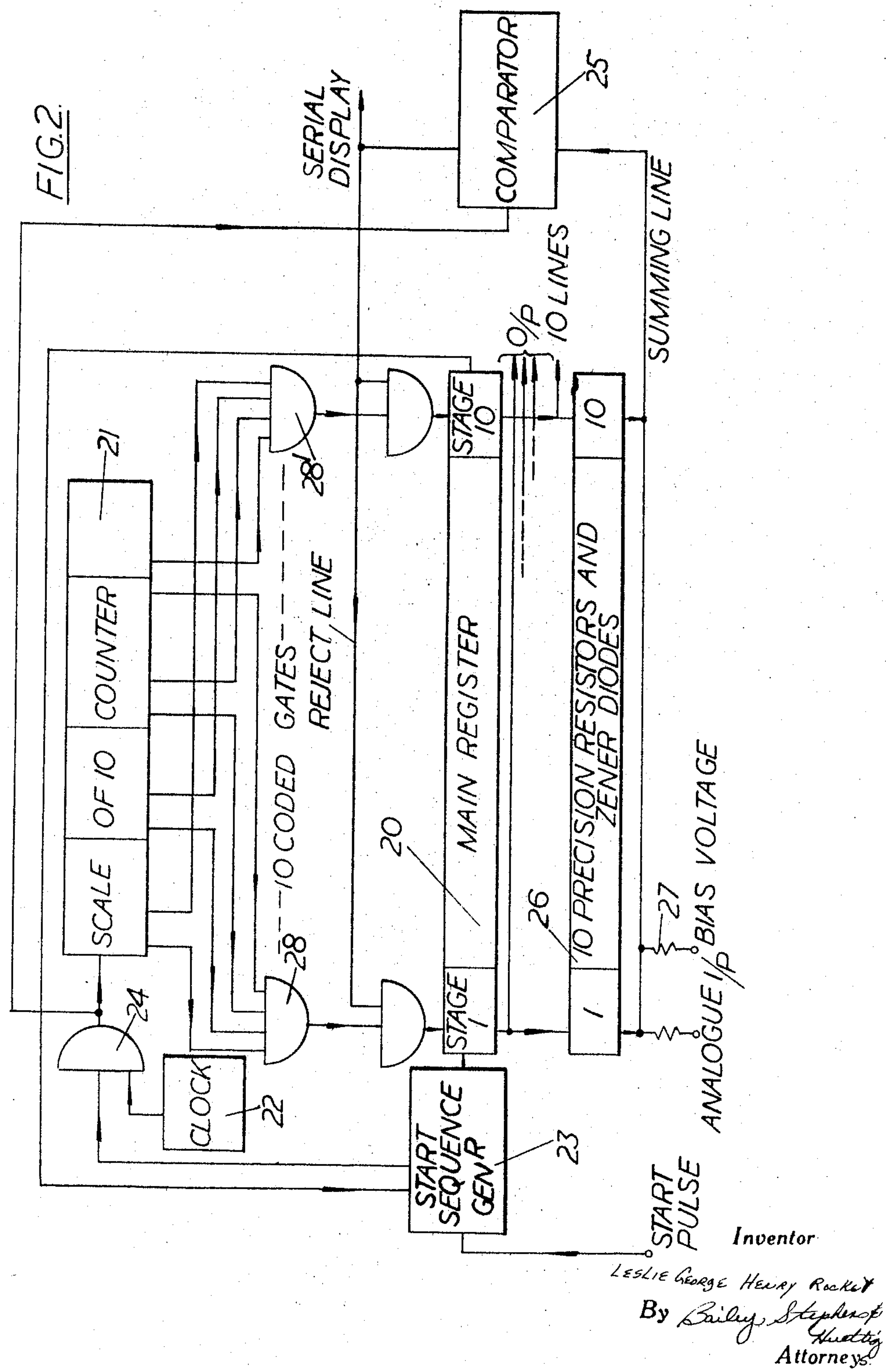

In order that the invention may be more clearly understood, a specific example of a circuit embodying the invention and of an analogue to digital converter including a number of such circuits will now be described with reference to the accompanying drawings; in which:

FIGURE 1 is a circuit diagram of a single circuit embodying the present invention for supplying a stabilised output voltage; and FIGURE 2 is a schematic block diagram of an analogue to digital converter.

In FIGURE 1 an NPN transistor 1 constituting the switching device is connected in series with a load resistor 2 between a source of zero electrical potential and a source of +10 volts supply potential to form an emitter follower circuit. An input signal, such as the rectangular output signal from a bistable circuit, is applied to the base electrode of transistor 1 and, depending on its value either causes the transistor emitter follower 1 to conduct or to be driven beyond its cut-off state. Connected in parallel with the load resistor is a potential divider consisting of a Zener diode 3 in series with a regulator resistor 4. The resistive value of the regulator resistor 4 is chosen to be considerably higher than the resistance of the Zener diode in its conductive state and by this means changes in the values of the voltage at the emitter electrode of the transistor 1, due to thermal leakage in the drive circuit to the transistor and drift in the transistor are reduced in accordance with the ratio of these resistances. The supply potential supplied to the collector electrode of transistor 1 is stabilised and chosen to enable a sufficiently high value to be chosen for the regulator resistor 4 while maintaining the potential at the output point of the circuit at the junction of the regulator resistor 4 and Zener diode 3 at a nominal 6 volts. Further stabilisation, such as may be required for example in the more significant stages of a counter, may be achieved by providing a resistor in series with the collector electrode of the transistor 1 to ensure that transistor 1 is driven towards saturation and its dependence on variations in temperature are thus reduced. Adjustment of the value of the regulator resistor 4 serves to provide a fine adjustment of the standing Zener current.

In its non-conductive state, the emitter follower transistor 1 provides a high impedance between the positive supply line and the junction of the load resistor 2 and the regulator resistor 4. In this condition the emitter follower load resistor 2 in series with the regulator resistor 4 provides a comparatively low impedance discharge path for any potential difference which exists across the Zener diode owing to the charging of its inherent capacitance from either the supply line or the summing point and thus prevents interaction with the remaining circiuts connected to the summing point. A digitising or weighting resistor 5 connected to the output point of the circuit at the junction of the Zener diode 3 and the regulator resistor 4 determines the magnitude of the output current applied to the summing point. The temperature coefficient of this digitising resistor 5 is chosen to be similar in both magnitude and sign to that of the Zener diode 3.

When the transistor emitter follower 1 is rendered conductive by a change in the input signal producing a positive bias at its base electrode, the transistor provides a low impedance voltage source for the Zener diode thus causing it to be switched into conduction with a fast "switch on" time and thus establishing a stable reference voltage at its junction with the regulator resistor 4. When the emitter follower transistor 1 is reverse biased by the input signal at its base electrode so that it is cut-off, it prevents a high impedance between the source of positive potential for the Zener diode causing the output terminal of the circuit at the junction of the Zener diode 3 and the regulator resistor 4 to be connected to the source of zero potential through the regulator resistor 4 and the emitter follower load resistor 2 forming a low impedance discharge path.

The thermal stability of the circuit described is primarily a function of the temperature co-efficient differential of the Zener diode and the digitising resistor in the output circuit and, since these combined effects are of a second order and dependent only on the quality of the components chosen, this enables a high degree of stability to be achieved.

FIGURE 2 is a block diagram illustrating an analogue to digital converter in which the digitising technique used is the "step-by-step" principle of successive approximation. The operation of this circuit will now be described briefly. The leading edge of a start command pulse resets the last word stored in the main register 20 and the scale of ten counter 21 and also triggers a monostable circuit in the start sequence generator 23 into its unstable state. When this monostable circuit resets, it triggers a bistable circuit which opens a gate 24 to allow 100 kc./s. pulses to be transmited to the scale of ten counter 21. The first output pulse from the clock 22 after the gate 24 has been opened causes the counter 21 to begin its sequence of ten combinations which open a series of ten coded gates. The first code change is not used in order to allow sufficient time for complete re-setting of the circuits. Two of the ten coded gates are illustrated diagrammatically at 28 and 28'. The output signals of the series of ten coded gates are used to switch, sequentially, the bistable circuits constituting the main register 20. In the particular example illustrated, the most significant digit of the main register is called first and successive clock pulses sequentially call the bistable associated with the lesser significant digits. Each clock pulse has a duration of the order of 10 microseconds and 8 microseconds delay is allowed to elapse before actual sampling occurs to ensure that stabilisation of the digital weighting current is achieved. Each bistable stage of the main register is associated with a diode gate of the type illustrated in FIGURE 1. The output signal of the bistable circuit forming the input signal to the base electrode of the emitter follower transistor of the gate. A comparator circuit 25 is connected to receive an input signal from the summing line which, in turn, receives output signals from the coded digitising resistors of the successive precision diode switches 26 associated with the bistable stages of the main register 20. After the passage of a delay allowing for stabilisation, the clock pulse is applied to the comparator circuit 25 which detects whether the reference current applied to the summing line via the digitising resistor of the diode switch associated with the bistable stage of the highest significance in the main register 20 is greater than or less than the analogue input current. If the net potential on the summing line is positive indicating that the current from the digitising resistor of the diode switch of the highest significance is greater than the analogue input current, (i.e. that the magnitude of the analogue input voltage is less than half the scale of the converter) a reject pulse is generated by the comparator circuit 25 which switches off the bistable circuit of greatest significance in the main register thus removing the associated digitising resistor from connection with the summing line. On the other hand, if the output current from the digitising resistor of the diode switch associated with the bistable circuit of highest significance in the main register is less than the analogue input current, the comparator circuit 25 does not generate a reject pulse and the bistable stage remains in its selected state causing that digitising resistor to remain connected to the summing line. After sampling of a particular stage of the main register 20 in which it is determined whether that stage remains selected or is rejected, that stage is no longer sensitive to future reject pulses in the same cycle of the clock generator. Clock pulses proceed to sample successive stages of the main register, and therefore successive digitising resistors, in order of decreasing significance until the last stage has been sampled when the total output current from the digitising resistors of the precision diode switches 26 is equal to the analogue input current within the highest resolution provided by the digitising resistor associated with the least significant stage of the main register. In this condition the state of the successive stages of the main register 20 represents the analogue input signal in digital form. As the last bistable stage of the main register 20 is called the bistable circuit in the start sequence generator 23 is reset to close the clock pulse gate 24 and prevent further application of clock pulses to the scale of ten counter until reception of the next start pulse. In the absence of application of a biasing voltage to bias resistor 27 the analogue digital converter is designed to accept analogue voltages in the range from 0 to −6 volts and the comparator circuit 25 effectively searches for a zero condition on the summing line. However the introduction of a biasing current through biasing resistor 27 enables the same equilibrium condition to be shifted so that an input signal in the range of −3 to +3 volts may be accepted. In this latter case the first, most significant, digitising resistor serves to determine the sign of the input voltage and the remainder of the digitising resistors provide an indication of the magnitude of the input signal to half the previous resolution.

If a negative stabilised reference voltage is required, a PNP transistor may be used in place of the NPN transistor illustrated together with a reversal of the Zener reference diode and the sense of the supply voltages.

I claim:

1. A stabilised reference supply circuit for connection through a digitising resistor to the summing point of a voltage analogue to digital converter of the successive approximation type described, comprising: a Zener diode, one electrode of which is connected via a regulator resistor and a switching device having low and high impedance states to a source of supply potential and the other electrode of which is maintained at a substantially constant voltage; and further comprising a resistive path in parallel with the Zener diode, providing a discharge path for the diode which is of low impedance with respect to the impedance of the path formed by the switching device in its high impedance state.

2. A circuit according to claim 1, in which a transistor having its emitter-collector circuit connected between the source of supply potential and the regulator resistor constitutes the switching device, means being provided for applying an input signal to the base electrode of the transistor to bias it between conductive, low impedance, and non-conductive, high impedance, states.

3. A voltage analogue to digital converter of the successive approximation type including a series of circuits according to claim 2 each associated with an individual bistable stage of the main register of the converter, and in which the output signals from the individual bistable stages of the main register constitute the input signals to the base electrodes of the transistors forming the switching devices of the associated stabilised reference supply circuits.

4. A circuit according to claim 1, in which the discharge path for the transistor includes the regulator resistor and a further resistor connected in series with the switching device.

No references cited.

DARYL W. COOK, *Acting Primary Examiner.*

W. J. KOPACZ, *Assistant Examiner.*